(12) United States Patent
Wipasuramonton et al.

(10) Patent No.: US 7,222,877 B2
(45) Date of Patent: May 29, 2007

(54) OCCUPANT-TO-OCCUPANT AIR BAG SYSTEM

(75) Inventors: Pongdet P. Wipasuramonton, Rochester, MI (US); Charles S. E. Walczak, Warren, MI (US); Shakir M. Salmo, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 68 days.

(21) Appl. No.: 10/403,614

(22) Filed: Mar. 31, 2003

(65) Prior Publication Data
US 2004/0188988 A1 Sep. 30, 2004

(51) Int. Cl.
*B60R 21/16* (2006.01)
(52) U.S. Cl. ............... 280/730.1; 280/729; 280/730.2; 280/743.2
(58) Field of Classification Search ............... 280/729, 280/730.1, 730.2, 743.2
See application file for complete search history.

(56) References Cited

U.S. PATENT DOCUMENTS

| | | | |
|---|---|---|---|
| 3,774,936 A | 11/1973 | Barnett et al. ........ 280/150 AB |
| 3,795,412 A * | 3/1974 | John ....................... 280/730.1 |
| 5,464,250 A * | 11/1995 | Sato ........................ 280/743.1 |
| 5,470,103 A | 11/1995 | Vaillancourt et al. .... 280/730.1 |
| 5,507,519 A | 4/1996 | Schettler-Köhler ....... 280/730.1 |
| 5,636,862 A * | 6/1997 | Cheung et al. .......... 280/730.2 |
| 6,220,629 B1 * | 4/2001 | Wipasuramonton et al. ..... 280/743.1 |
| 6,773,026 B2 * | 8/2004 | Meyer ....................... 280/729 |

FOREIGN PATENT DOCUMENTS

| | | |
|---|---|---|
| DE | 19727394 A1 | 1/1998 |
| EP | 0810128 A2 | 3/1997 |
| GB | 2341356 A | 3/2000 |
| JP | 10264761 | 10/1998 |

* cited by examiner

*Primary Examiner*—Eric Culbreth
(74) *Attorney, Agent, or Firm*—Markell Seitzman

(57) ABSTRACT

An air bag assembly (80) configured to deploy in a generally vertical direction from the roof of a vehicle, comprising: an air bag (100) having at least one inflatable chamber (110, 112) defined by a material so configured, the inflatable chamber including a top (top end) and an opposite bottom (bottom end); first mounting elements (192, 196) for mounting the air bag to a mounting surface such as the roof of the vehicle and for providing, proximate the top end of the inflatable chamber, a wide and stable base portion from which the air bag extends; an external tether enveloping the material forming the inflatable chamber and positioned on opposing sides of the inflatable chamber, the external tether connected to the air bag proximate the bottom end of the chamber and including respective tether ends connected to the first mounting elements.

22 Claims, 12 Drawing Sheets

OCCUPANT-TO-OCCUPANT AIR BAG SYSTEM

BACKGROUND AND SUMMARY OF THE INVENTION

The present invention relates generally to air bags and more particularly to an air bag which when deployed is located between adjacently seated occupants (including driver and passenger) of the vehicle to protect these occupants from impacting one another, as well as vehicle structures during an accident such as a side impact crash or rollover.

It is an object of the present invention to provide an occupant-to-occupant air bag deployable from a vehicle roof and when deployed is located between adjacent occupants of the vehicle.

Accordingly the invention comprises: an air bag assembly configured to deploy in a generally vertical direction, comprising: an air bag having at least one inflatable chamber defined by a material so configured. The chamber includes a first end and an opposite second end; the air bag further including first mounting elements for mounting the air bag to a mounting surface and for providing, proximate the first end of the inflatable chamber, a wide and stable base adjacent the roof, from which the air bag extends as the air bag inflates. An external tether cradles or envelops the air bag proximate the inflatable chamber(s) on opposing sides thereof. The external tether is connected to the air bag proximate the second end of the chamber and includes respective tether ends connected to the first mounting elements proximate the roof.

Many other objects and purposes of the invention will be clear from the following detailed description of the drawings.

BRIEF DESCRIPTION OF THE DRAWINGS

FIG. 1 is illustrative of the prior art.

DETAILED DESCRIPTION OF THE DRAWINGS

Figure 1:
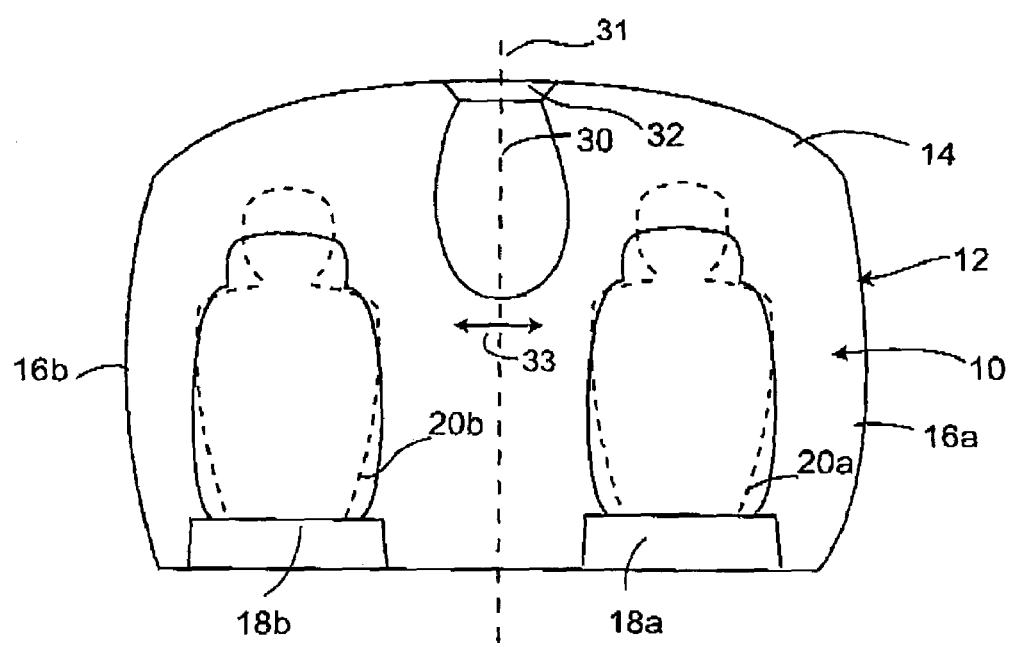
FIG. 1 diagrammatically shows a cross-section of a vehicle passenger compartment showing an occupant-to-occupant air bag, which is located between adjacent vehicle occupants.

Reference is briefly made to FIG. 1, which illustrates a prior art occupant-to-occupant system of the type shown in the German patent application DE 197 27 394 A1. More particularly, FIG. 1 shows a cross-sectional view of a typical passenger compartment 10 of the vehicle 12. Also illustrated in FIG. 1 is the vehicle roof 14 and vehicle sides 16a and 16b, which may also comprise the vehicle side doors, windows, trim, etc. The vehicle also includes a plurality of seats 18a and 18b for a respective occupant 20a and 20b (either of which can be a passenger or driver or both passengers). FIG. 1 also shows an occupant-to-occupant air bag 30 in a deployed condition protecting the occupants' body parts from impacting one another. The air bag 30 includes mounting means 32, including a breakable housing, for mounting the air bag to the roof 14 of the vehicle. The air bag 30 is inflated by inflation gas provided by an air bag inflator; the inflator may be included within (or adjacent) the housing as part of an air bag module (which also includes the air bag 30). One of the deficiencies of a system such as shown in FIG. 1 is the deployed air bag 30 has a tendency to move sideways (relative to the passenger compartment of the vehicle) away from the longitudinal centerline 31 of the vehicle as illustrated by arrow 33. If such movement is sufficient the air bag will not remain located between the adjacent occupants of the vehicle.

Figure 2:
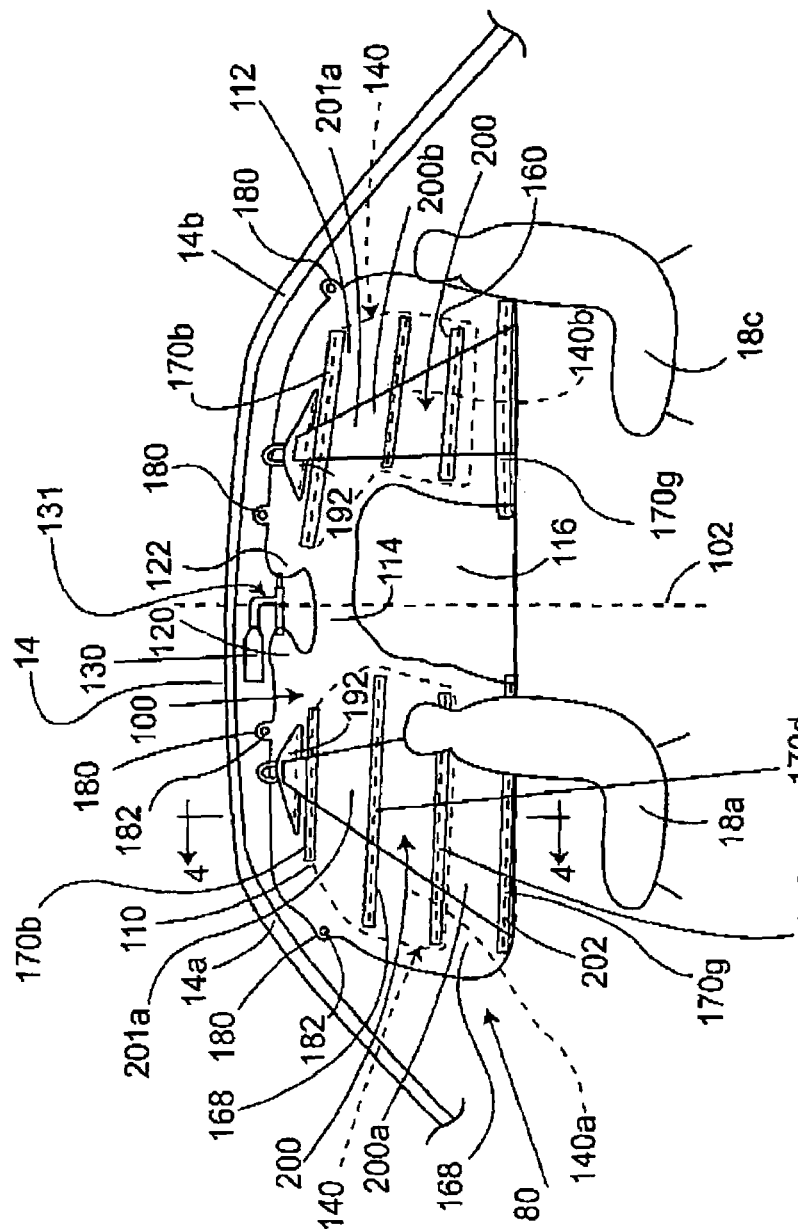
FIG. 2 illustrates a cross-sectional view of a passenger compartment of a vehicle taken along a longitudinal axis of the vehicle and shows one version of an occupant-to-occupant air bag incorporating the present invention.

Reference is briefly made to FIG. 2, which illustrates one embodiment of the invention. In the present invention an air bag assembly 80 including an occupant-to-occupant air bag 100 is also mounted to the inside surface of a roof 14 of the vehicle. The air bag 100 can include an external tethering arrangement, including external tethers 192, 200, which enhances the vertical stability of the deployed air bag 100, that is the air bag's ability to stay in a vertical post-deployment orientation. Additional embodiments of the invention (for example see FIGS. 8a and 8b) take advantage of the increased vertical stability wherein the air bag is arranged to deploy perpendicular to the centerline of the vehicle and when inflated is located in front of the occupant or occupants to be protected.

FIG. 2 illustrates a side view of an air bag 100 configured as an occupant-to-occupant air bag. FIG. 2 also shows a cross-sectional view of a passenger compartment of a typical vehicle illustrating the relative location of two of the seating positions (one front 18a and one rear 18c). The air bag 100 is initially stored within a breakable housing 224 (see FIG. 5) or it can be stored in a soft cover behind a breakable headliner, which is part of an air bag assembly 80, located on the underside of the roof. In this embodiment, the air bag 100 is intended to protect occupants in more than one row of seats and is oblong in shape and when inflated will expand along the longitudinal centerline of the vehicle and be positioned generally from the front of the vehicle toward the rear of the vehicle so one air bag can separate adjacent occupants of the front and rear seating positions. When expanded the air bag 100 will become positioned between a set of front seats and a set of rear seats of the vehicle. Front seat (also referred to as a seating position) 18a and a rear seat (seating position) 18c are shown.

In the present invention the air bag is designed to protect the head of the occupant and will generally extend from the center of the roof to about the occupant's shoulder (as such the air bag will protect the shoulder or a portion thereof).

The air bag can be made higher (taller) so when deployed it extends lower than the height of the shoulder of a typical occupant to protect other portions of the occupant, for example the occupant's torso. Further, even though the air bag 100 will not be positioned when inflated against the side of the vehicle, for the purposes of illustration it can be appreciated the air bag will extend from about the A-pillar 14a (or windshield) in the front to about the C-pillar 14b in the rear. In concept, one or more air bags can be configured along the centerline of the vehicle and positioned between adjacent seating positions regardless of the length of the vehicle. In another preferred embodiment, a smaller air bag is sized to protect adjacent occupants of a single row of seats (see FIG. 2d), for example, the front seats or the rear seats of the vehicle. In this embodiment, the fore-aft length of the air bag will be appropriately shorter than the air bag spanning the front and rear seats.

With regard to the elongated air bag 100 shown in FIG. 2, the air bag 100 includes at least two inflatable chambers such as a forward (or first) inflatable volume or chamber 110 and a rear (or second) inflatable volume 112 with a non-inflatable or non-active portion 116 therebetween. It is known in the art that the use of a non-inflatable portion is optional in an air bag such as a curtain air bag. The benefit provided by the non-inflatable portion is the inflatable volume of the air bag is reduced; consequently a smaller capacity inflator can be used to inflate the air bag. The non-inflatable portion of the air bag is located in a region where interaction with an occupant is less likely to occur. The inflatable volumes or chambers 110 and 112 are communicated through a narrow center inflatable portion or passage 114, which is located above the non-inflatable portion 116 and which is defined by the size and position of the non-inflatable portion 116.

Figure 2A:
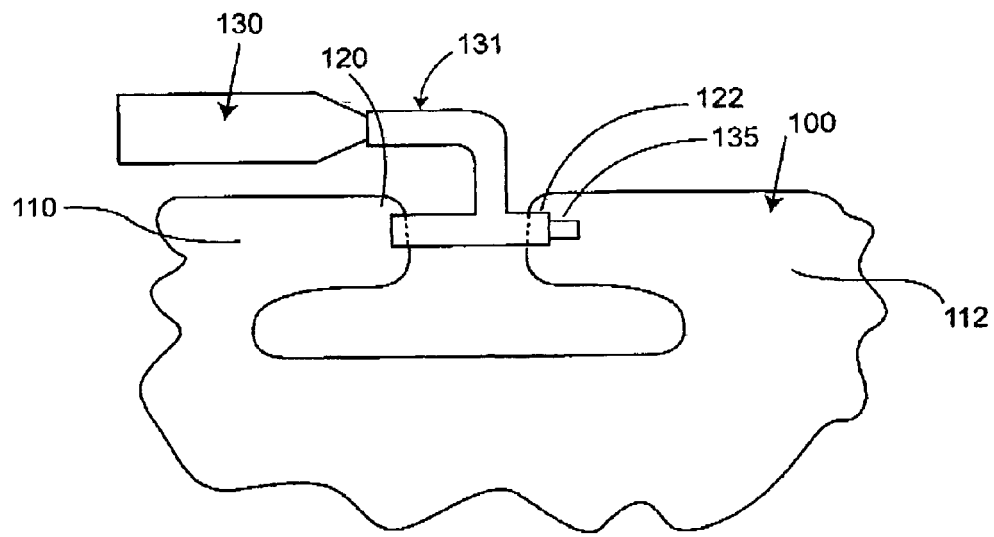
FIG. 2a shows an expanded view of a portion of FIG. 2.

Each of the volumes 110 and 112 include a respective inlet 120 and 122. The inlets are shown in an opposite facing configuration. In the illustrated embodiment a single inflator 130 is communicated to both inlets 120 and 122 so the chambers are inflated generally simultaneously. Separate inflators can be used for each chamber. The manner in which the inflator communicates with the inlets (as well as the location and number of inlets) is not of importance to the present invention. For example, a single inflator 130 can be connected to the air bag through a hollow T-connector or coupler 131 (also shown in FIG. 2a). An inlet of the T-connector is connected to the outlet of the inflator and each of the outlets of the T-connector 131 communicated to a respective one of the inflatable volumes 110 or 112. Control orifices including other types of flow restrictions can be configured in the T-connector 131 and in the inlets 120 and 122 of the air bag to control the flow of inflation gas to the inflatable chambers 110 and 112.

Figure 2B:
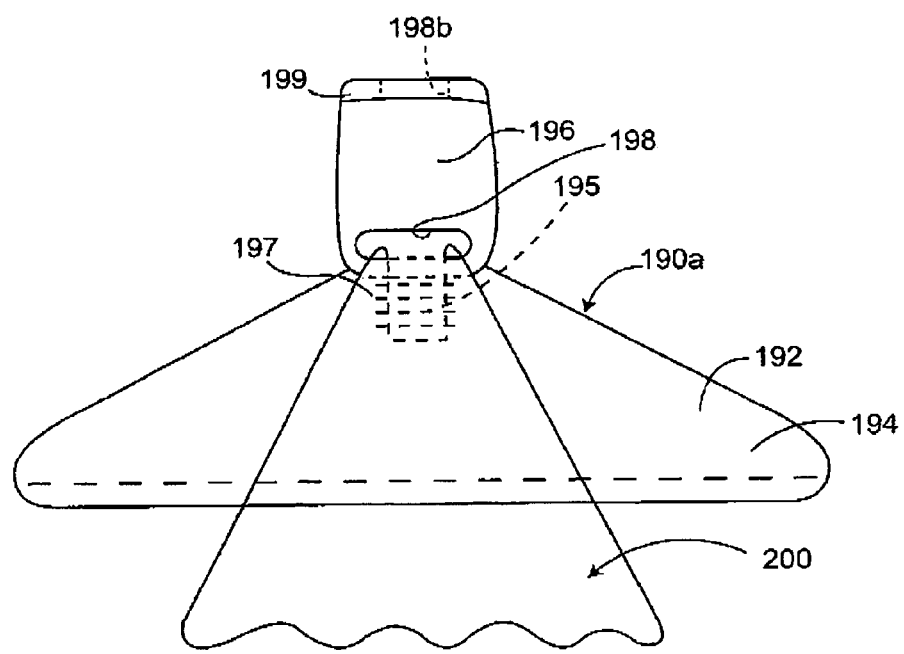
FIGS. 2b and 2c show details of a mounting arrangement.
Figure 2C:
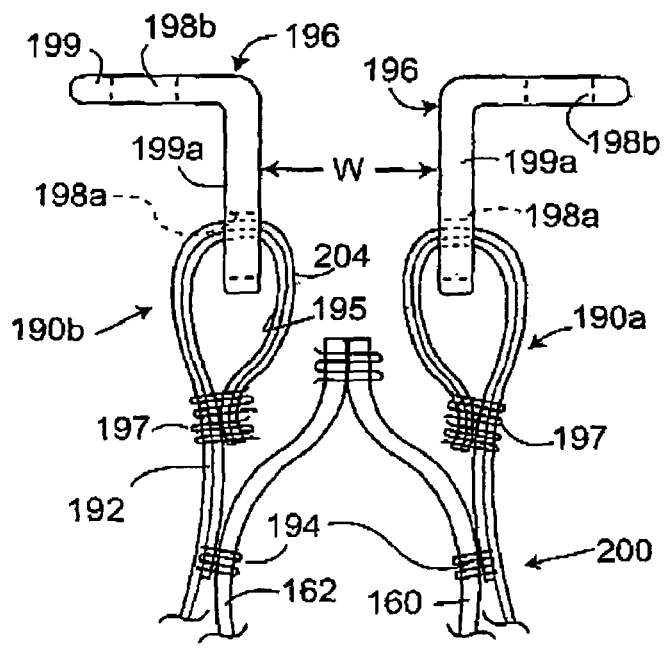

Each of the inlets 120 and 122 (of the air bag) can include a control orifice 133 sewn or inserted therein or the control orifice can be realized by using a narrowed passage 135 (also shown in FIG. 2e) such as a flexible or rigid tube of narrow diameter. As mentioned above, the orifice(s) 133 or narrow passage (i.e. an orifice or flow restrictor) 135 balance air bag flow to the inflatable volumes 110 and 112. Additionally, the inflator and the inlet or inlets can be located to communicate inflation gas to locations on the inflator other than the middle of the air bag. For example, a single inflator can be communicated to a single air bag inlet located on one side of the air bag such as near the A-pillar as conventionally done in many curtain air bags.

In a side impact accident the air bag will become inflated before the occupants have moved much from their respective pre-accident (seated) locations. The air bag 100 includes an optional internal tether or separator generally referred to by numeral 140, and more particularly 140a and 140b, which assists in maintaining the vertical orientation of each chamber 110 and 112. Numerals 140a and 140b respectively refer to the forward and rearward internal tethers as shown in greater detail in FIGS. 3 and 3a. The shape of the tethers 140a and 140b will generally follow the shape of the chamber in which it is located. The shape and length of either tether 140 will also vary with the desired separation distance between the opposing panels forming the air bag and the desired shape of the inflated air bag 100. The tether 140 (or tethers 140a and/or 140b) includes sides 142 and 144 and ends (also a top and a bottom) 146 and 148. In the present embodiment the width of the tether is not as wide as the inflatable chamber in which it is used.

Figure 3:
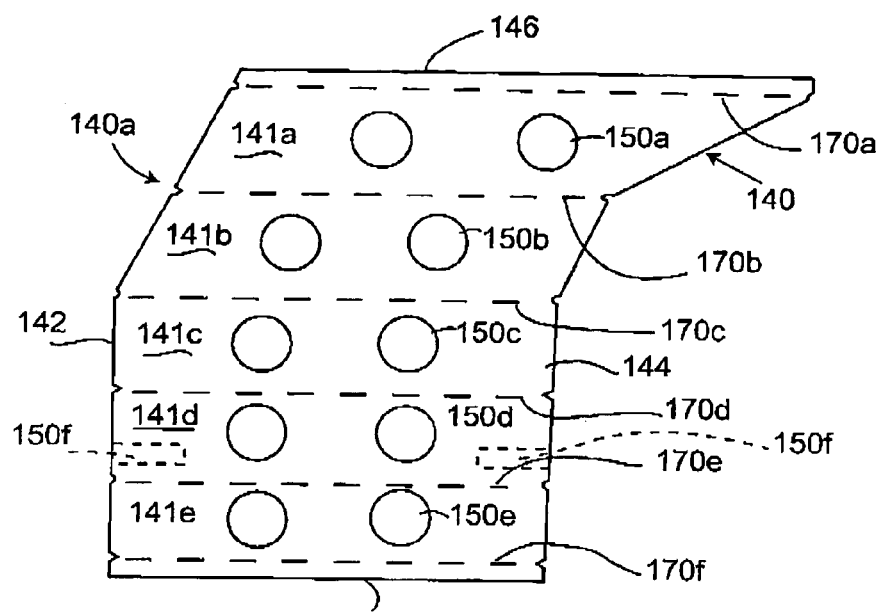
FIGS. 3 and 3a are plan views of an internal tether or separator.
Figure 3A:
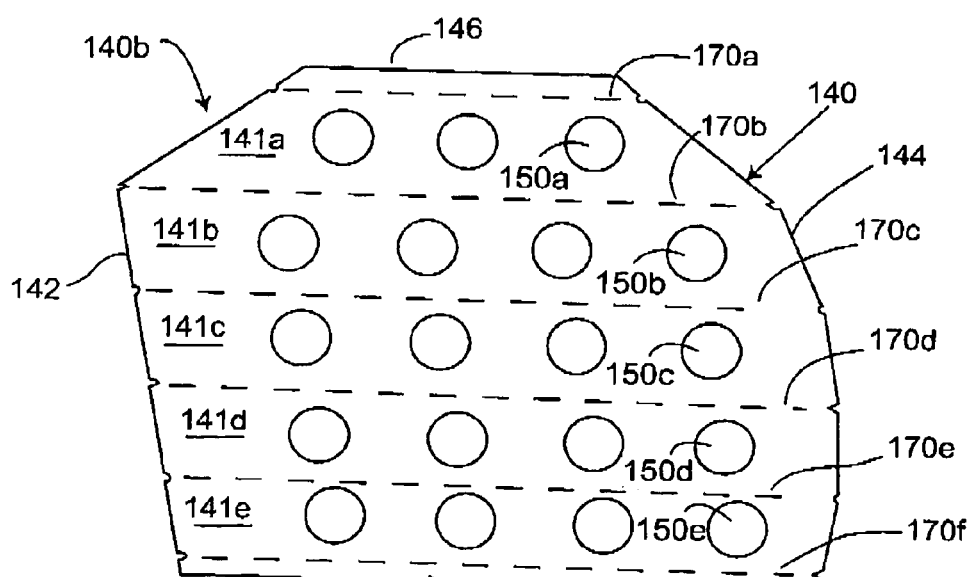

Each tether or separator 140a and 140b is subdivided into a plurality of tether sections or segments 141a-e. Each tether section includes sets of openings such as 150a-150e to facilitate gas flow thereacross. These openings 150a-150e can also be formed as slots, which extend inwardly at the sides of the tether as shown In phantom line 150f of FIG. 3. FIGS. 3 and 3a show the location of various seams 170a-g, which are used to secure the tether 140 to the side panels of the air bag 100 as also shown for example in FIGS. 4 and 4a. As can be appreciated the locations of the seams also define the tether sections 141a-f.

Figure 4B:
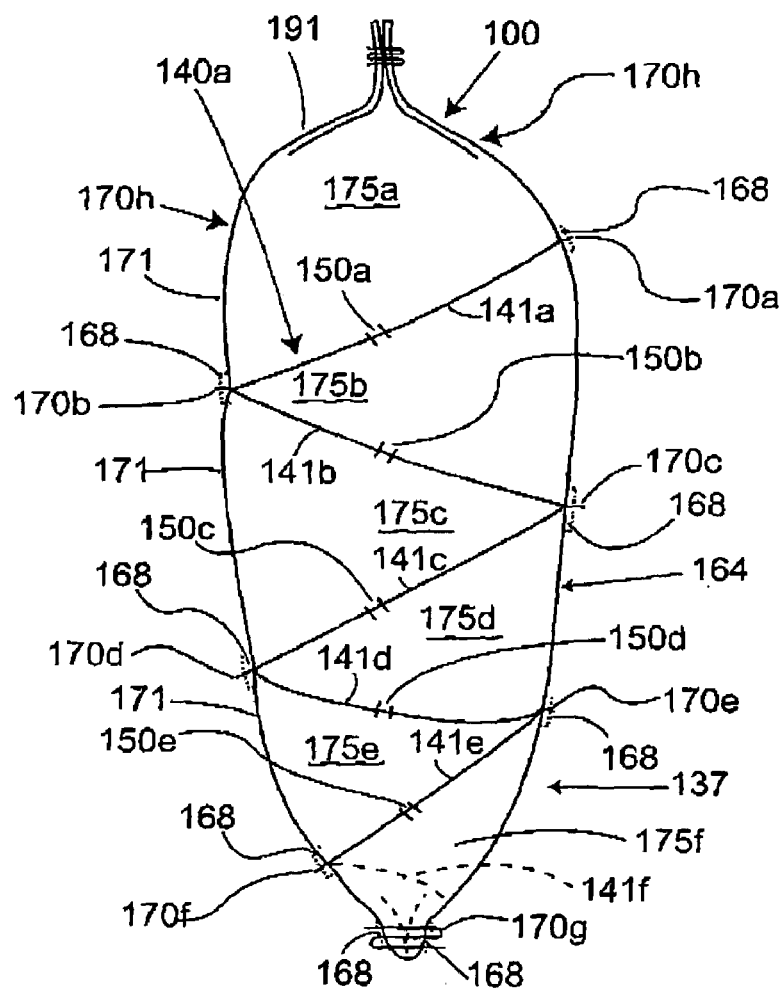
FIG. 4b shows an alternate embodiment of the invention.
Figure 4:
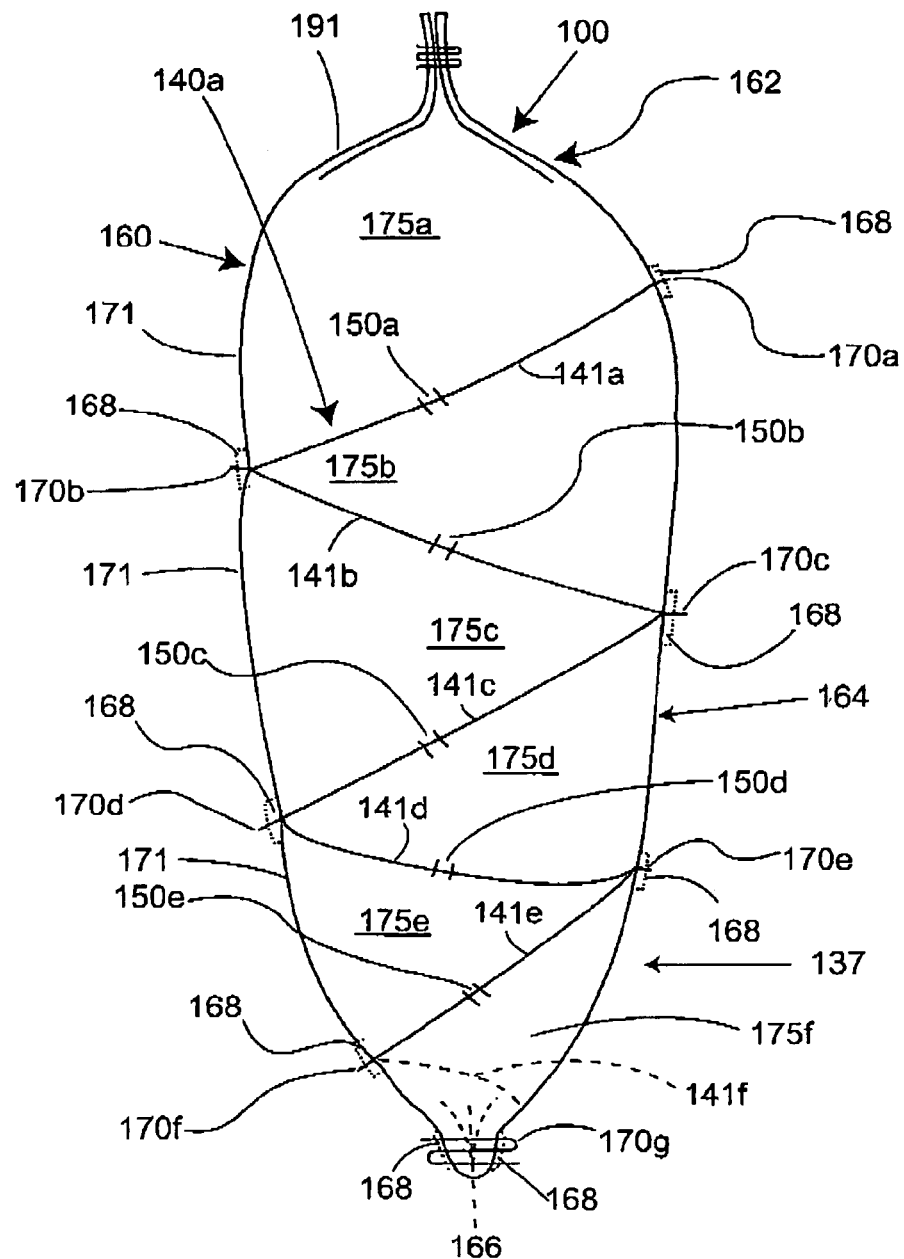
FIG. 4 illustrates a cross-sectional view taken through section 4-4 of FIG. 2 of a partially constructed air bag.

Reference is made to FIG. 4, which illustrates a cross-sectional view of the air bag 100 (the external tether is not shown) and shows the internal tether 140a connected to the opposing panels of the air bag; the configuring of tether 140b within chamber 112 is substantially identical. As is known, an air bag can be made using a variety of panels of material and methods. The air bag 100 comprises a first and second panel 160 and 162. For example, the panels 160 and 162 can be formed by folded-over halves (folded over a centerline 166) of a larger main panel 164 (as shown in FIG. 4). Alternatively, the air bag 100 and the panels can be achieved by sewing together two smaller (half-sized) panels 170h (shown in FIG. 4b), which are generally the same size and shape to achieve the air bag shown in FIGS. 2 and 4. The benefit of using the folded-over main panel, as in the preferred embodiment of the invention, is the elimination of a seam, joint or weld across the bottom of the air bag, which is typically needed to join the separate panels together.

In the illustrated embodiment, the tether or separator 140a extends between the panels 160 and 162 in a generally zigzag manner. The tether 140a can be sewn to the panels along various seams or otherwise attached at these locations. As mentioned, if the air bag includes a plurality of inflatable chambers such as 110 and 112 each chamber has its own tether 140a and 140b.

In the preferred embodiment of the invention each tether or separator 140 (140a, 140b) is sewn to the air bag panels 160 and 162 along seams (or joints) 170a-f. In the preferred embodiment neither internal tether 140a or 140b extends to the bottom of its respective chamber 110 and 112. FIG. 4 shows an additional tether section 141f, which could be used to extend the tether 140 (140a, 140b) to a lower portion of the air bag or even to seam 170g. As can be appreciated, other methods of joining the panels together can be used such as radio frequency (rf) bonding (welding) the tether 140 to the panels 160 and 162.

The lowest seam (or joint) 170g is located near the bottom of the chamber 110 and 112, and essentially pinches the lower portions of the opposing panels 160 and 162 together to create a double thickness portion of the air bag. The remaining seams (joints) alternate between the panels to achieve the zigzag tether attachment pattern. As mentioned, the spacing between consecutive seams (or joints) is chosen to achieve the desired spacing (width) of the panels when the air bag is inflated.

As is known in the art, every time a sewn seam is created in an air bag (especially one using woven material or coated woven material), a plurality of thread and needle holes is also created, which affect the overall permeability of the air bag. If permeability is of concern these holes should be closed. In the illustrated embodiment, a strip or segment of tape 168 (see FIGS. 2 and 4) such as adhesive tape can be applied to each panel 160 and 162 at the location of the sewn seam before the tether 140 is sewn to the panels 160 and 162. The adhesive tape 168 can be placed on the outside (or to the inside) of each of the panels 160 and 162 at predetermined rows or locations. One construction that uses this type of tape reinforcement is shown in U.S. Pat. No. 6,220,629, which is incorporated herein by reference. The tape used to close the thread and needle holes can also be of the pressure adhesive or heat sensitive type.

Figure 4A:
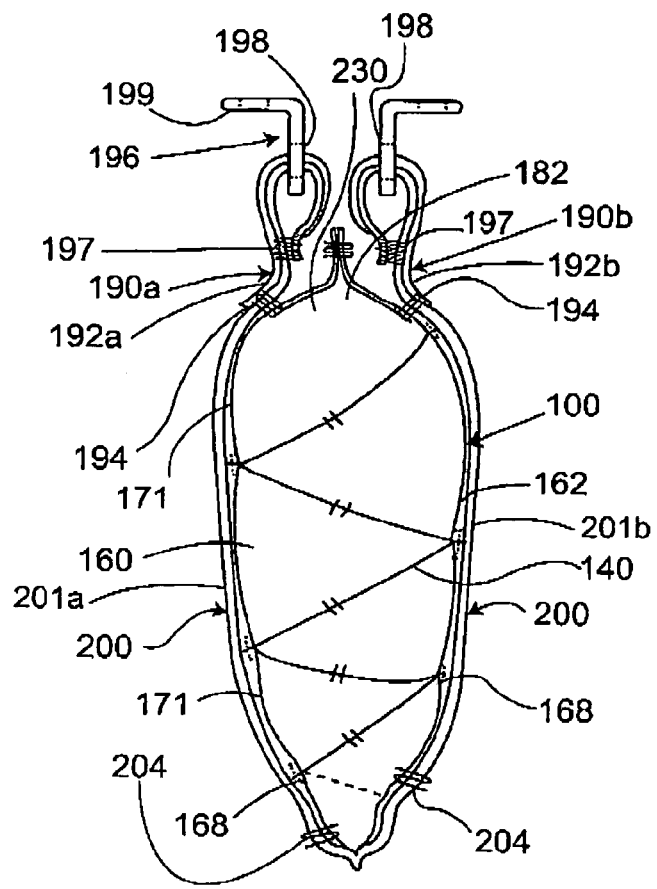
FIG. 4a illustrates a cross-sectional view showing additional features of the air bag of FIG. 4.

FIGS. 4 and 4a show the general shape of the either chamber 110 or 112 of the air bag 100. As can be seen the shape of the panels 160 and 162 and the relative separation is defined by the internal tether 140 (140a and/or 140b). The exterior of each panel 160 and 162 includes segments of the tape (adhesive) at the locations of the panel-tether seams and at the bottom seam location. In FIG. 4, the sewn seams 170a-170g extend through the adjacent adhesive tape segment 168 (which is optional), through the tether (which functions as a separator panel) 140 and through the respective side panels 160 and 162. It has been shown through testing of the present invention the zigzag orientation of the tether or separator panel 140 (140a, 140b) contributes to the vertical stability (lateral stiffness) of the air bag, which reduces the tendency of the air bag to move off-vertical (in this case to the right and to the left as shown) as it is inflated and becomes fully pressurized.

The improvement in the bag's vertical stability, in part, seems to be related to the plurality of contiguous bulges 171 formed in the sides of each of the panels 160 and 162 between each seam. These bulges are formed in the inflated air bag 100 by the tension created and restrictions caused when tether 140a (and 140b) prevents the air bag 100 from assuming a more spherical, less restricted shape as it inflates and thus, the inflated air bag is taller for better occupant coverage. As can be seen, the bulges 171 are arranged in a stacked vertical orientation with each tether segment 141a-e arranged at an angle relative to the panel 160 and 162 to which it is attached. Additionally, each tether segment 141a-e forms an angular common wall between adjacent chambers 175a-175f of the air bag. Since each bulge is opposing a respective crease created by a sew line, such bulge will nullify any tendency of the air bag to bend about the crease. The chambers formed by sections of the internal tether and the main air bag panel will further provide vertical stability and bending resistance.

An added benefit of using the zigzag tether arrangement is when the air bag 100 is pushed sideways by interaction with a part of the occupant's body (see arrow 137 of FIG. 4, which is illustrative of a sideways force), the force is reacted against by at least one of the angled walls (usually two such walls) formed by the zigzag tether segments 140a-e. This interaction or load sharing is believed to increase the lateral stiffness of either chamber 110 or 112. As can be seen each tether 140a and 140b creates within a respective chamber 110 and 112 of the air bag 100 a plurality of partially enclosed, vertically stacked, horizontally arranged chambers or volumes 175a-f, each of which has a side (outside side wall) which bulges outwardly. As mentioned above, in the preferred embodiment, the width of the tether 140a, 140b is less than the width of the chamber in which it is used, consequently the side of each chamber 175a-f is open.

Preferably, the stacked chambers are configured so chamber 175a, adjacent to the upper mounting surface, is the largest chamber thereby providing a sufficiently wide base (or base region) 191 from which the remainder of each inflatable chamber 110 and/or 112 (and the other stacked chambers 175b-f) extends. In the preferred embodiment the cross-sectional areas of adjacently located chambers sequentially reduce in size from the top to the bottom of the air bag 100. This reduction allows the total volume of the inflated air bag to be controlled without significant loss of vertical stiffness and stability; however, the reduction in size is optional; for example the air bag can have a generally rectangular cross-section.

The air bag 100 includes a plurality of mounting features, which are useful in mounting the air bag to the roof of the vehicle. FIG. 2 shows the peripheral edge of the air bag can include a plurality of projections 180 with mounting openings 182, which are common to some curtain-like air bags. The projections can be formed in the edge of one or both panels 160 and 162, formed integrally on the air bag or formed using an inserted (attached) piece of material. The projections 180 are located in an edge of the air bag that will be mounted adjacent the mounting surface (in this case the roof) of the vehicle. In the case of the above embodiment the projections are in the top of the air bag as the mounting surface is the underside of the vehicle roof. A mounting fastener such as a threaded bolt is received through each of the openings 182 to secure the top peripheral edge of the air bag 100 to the roof rail 14. The edge of the air bag having the mounting features 180 can be bent so this edge can be laid flat against the interior surface of the roof or oriented vertically, in which case the fasteners enter through openings 182 in a horizontal direction.

As mentioned above the air bag 100 can also include an external tethering arrangement 190a,b, 196, 198, 200 to further enhance its vertical stability when deployed. Reference is made to FIG. 2 and FIG. 4a, which show additional features of the air bag 100. FIG. 4a is similar to FIG. 4 and has been included by way of illustration to show the construction of the external tethering arrangement.

As can be appreciated, to provide increased vertical stability of the air bag 100, it is desirable to form generally at the top of each inflatable chamber a relatively wide base, which is to be adjacent the roof of the vehicle. This is accomplished by sufficiently physically separating the portions of each side of the air bag (such as separating the top portions of panels 160 and 162) at at least two opposite locations.

To achieve this separation, the air bag 100 includes mounting members such as member 190a and 190b, which are used in opposing sets in conjunction with each inflatable chamber; one mounting member such as 190a is secured to panel 160 and the member 190b secured to panel 162. If an inflatable chamber is extremely wide (that is, its side-to-side dimension), two or more sets of mounting members may be used to support and locate the top of such an inflatable chamber proximate the roof. In general each mounting member 190a and 190b comprises a panel, such as the triangular shaped panel 192 (see FIGS. 2 and 2c) of air bag material, sewn along seam 194 to respective panels 160 and 162 generally near the top of each inflatable chamber 110 and 112. If needed, a tape segment such as 168 can be applied at the location of the seam 194 prior to sewing panel 192 to panel 160 or 162.

The apex (top) 195 (of panel 192), which can be formed into a thin tab or strip of material (see FIG. 2b), is adapted to be attached to a mounting bracket 196. More particularly, the tab 195 is slid through a first mounting opening 198 in the bracket 196, folded or looped over and sewn along seam or seams 197. The mounting bracket 196 includes an attachment portion to facilitate attachment to the roof. For example, the attachment portion can include a top portion 199 (of the mounting bracket), which extends at a right angle to a plate portion 199a (see FIG. 2c). The top portion 199 includes an additional opening 198b, which is utilized with a cooperating fastener (not shown) to mount the air bag 100 to or about the center of the roof.

As mentioned above other portions of the air bag are secured to the roof using the projections or tabs 180. Each mounting bracket 196 is shown spaced apart in FIG. 2c by a distance W. Typically this separation distance is in the range of 10 cm to about 20 cm to achieve a wide base of the air bag 100. In the context of the preferred embodiment of the invention the brackets are moved apart from the centerline of the vehicle toward a respective side of the vehicle. It should be noted the air bag stability will increase with increasing separation distance. However, there may be a tendency of the occupant's body to become caught or tangled in a tether if this separation distance is too wide.

Figures 7, 7A:
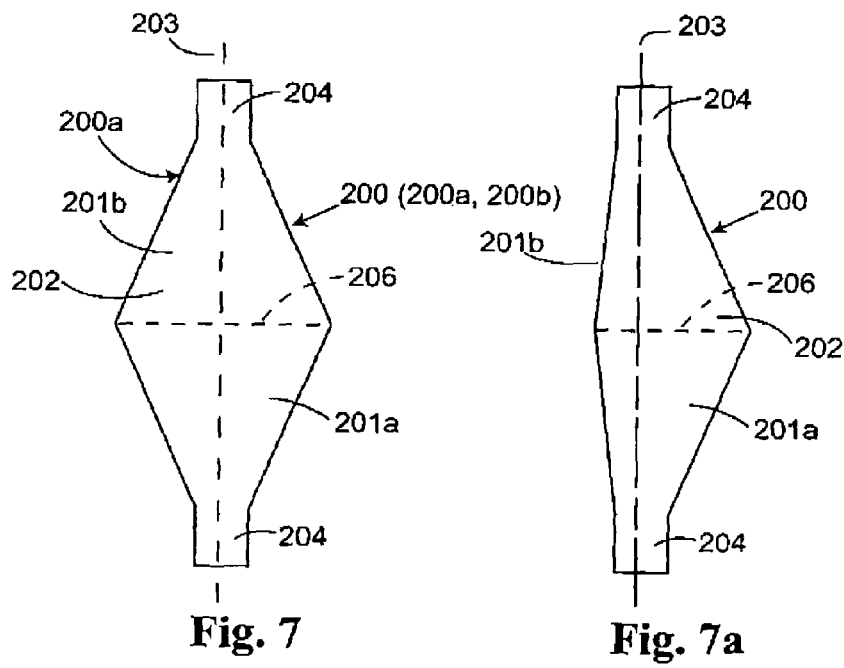
FIG. 7 is a plan view of an external tether.
FIG. 7a shows an alternate embodiment of an external tether.

The air bag 100 additionally includes a stabilization panel, which is also referred to as an external tether 200. Two such tethers 200a and 200b are used with air bag 100, one for each chamber 110 and 112. FIG. 7 shows a first embodiment of each external tether 200a or 200b. Each tether 200 includes a diamond shaped center body 202 with thin end tabs 204 at each end. Each tether 200a and 200b includes two panel-halves 201a and 201b respectively, which are folded over a centerline 206 when used with the air bag 100. In the preferred embodiment each external tether (also referred to as a stabilization panel) 200 is symmetric about axis 203.

FIG. 7a shows an alternate configuration of an external tether, which is asymmetric about centerline 203. When the stabilization panel 201a or 201b is folded over the centerline 206 the resulting panel-halves are generally triangular (isosceles or otherwise) in shape (as shown in the various figures). The wide base of each triangular half (that is, the centerline 206) is placed at the bottom of each inflatable chamber 110 and 112 with each triangular stabilization panel 201a,b extending upwardly along the panels 160 and 162 of the air bag. Two such panel-halves 201a are shown in FIG. 2 (which shows one side of the air bag 100), one for each panel 160 and 162 associated with each chamber 110 and 112. The other panel halves 201b are associated with the other side of the air bag. As can be appreciated, even though panel 192a (192b) and panel-halves 201a,b are shown as being triangular in shape, they can be of additional shapes. The triangular shape of panels 192a and 192b reduces the number of attachment points (to the roof) without sacrificing vertical stability in comparison to using panels of other shapes. The triangular panel 192a,b secures the top of the air bag to the roof and is easy to attach to the main panel and provides an easy to manufacture air bag.

Figure 2D:
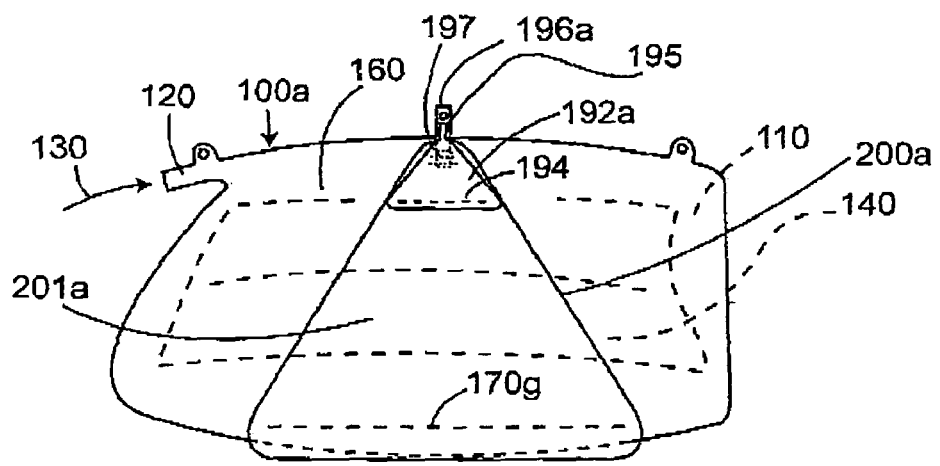
FIGS. 2d and 2e show alternate embodiments of the present invention.
Figure 2E:
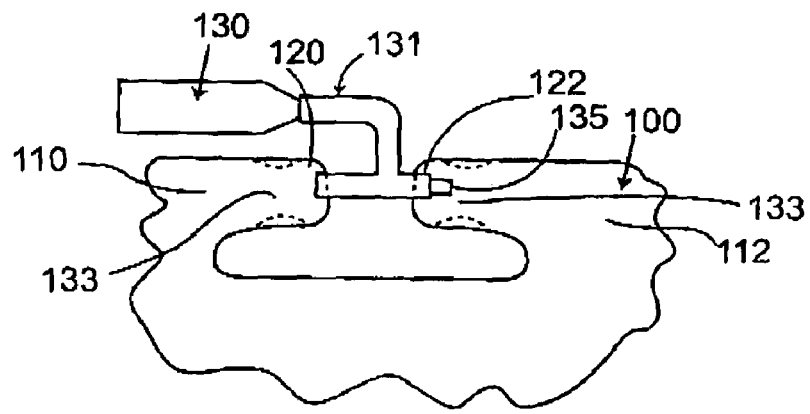

The apex or tab portion 204 of each panel half 201a and 201b is secured to a mounting member, which includes a respective panel 192a or 192b. This method of attachment can be done in a number of way; for example the apex or tab 204 of each panel 201a,b can be sewn directly to the apex 195 of a corresponding one of the triangular panels 192a,b as shown in FIG. 2d. In the preferred embodiment of the invention each tab 204 of each panel half 201a,b and tab 195 of panel 192a,b are slid through a respective fastener opening 198a (of each mounting fastener 196), folded over and sewn in place by a seam 197. Each folded-over panel or tether 200 operates as a cradle for a respective inflatable chamber 110 and 112.

Additionally each panel 200 near its centerline 206 can be sewn or otherwise secured to the air bag 100 to prevent the air bag from sliding within the trough or cradle formed by the folded-over U-shaped, panel 200 (200a and/or 200b). Sewn seam 170g joins the bottoms of the panels 160 and 162 at the lower extremes of each inflatable chamber 110 and 112 and also secures each panel 200a and 200b about a respective inflatable chamber 110 and 112. Each panel-half 201a and 201b adds to the vertical stability of the air bag 100 by preventing the air bag from moving off-vertical. As can be appreciated, if the air bag has a tendency to move off-vertical, or is pushed off-vertical by an occupant, one panel half 201a, 201b, as the case may be, will become tensioned, preventing or at least reducing this movement. As can be seen each panel half is connected from the bottom of a particular chamber 110 and 112 to panel 192 (or mounting bracket 196 to the roof). The size of each tether-half 201a, 201b is chosen in relation to the size of the air bag to effect the proper tensioning of the external tether as the air bag inflates.

Figure 6:
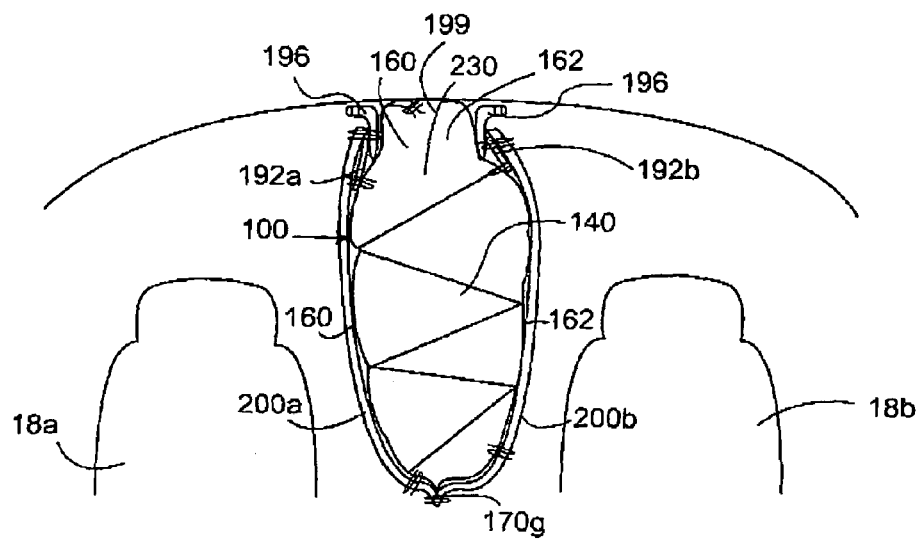
FIG. 6 shows the air bag in a deployed configuration between two adjacent vehicle seats.

Reference is made to FIGS. 4a and 6. To place the external tether 200 in tension when the air bag is inflated the height (length) of each half panel 201a and 201b is made shorter than the corresponding complementary height of the adjacent air bag panel 160 and 162. As the air ban inflates, the panels 160 and 162 push panels 201*a* and 201*b* downwardly against the brackets 196.

The purpose of the opposing pair of mounting brackets 196 and panels 192 is to assist in providing a wide and stable base 191 for the air bag, thereby lessening the tendency of the bag to move laterally after it is deployed when an occupant interacts with the air bag or for example, when there is a relative movement of the roof of the vehicle, which in-turn moves the air bag into the occupant. This wider base will be located generally along the top of each inflatable volume 110 and 112 for the configuration shown in the above drawings.

Figure 5:
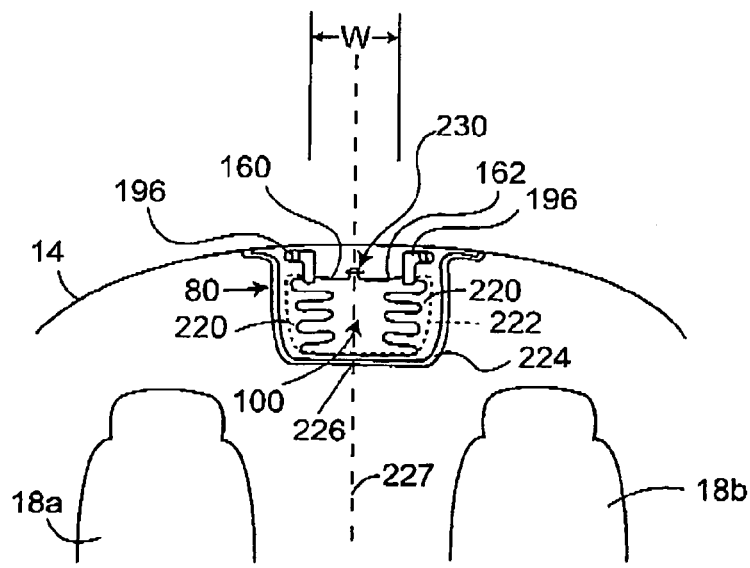
FIG. 5 shows a schematic view of an occupant-to-occupant air bag in a folded, pre-deployed configuration.

Reference is briefly made to FIG. 5, which shows the air bag assembly 80 secured to the roof 14 of the vehicle with the air bag 100 in a folded configuration. In this mounted configuration the mounting brackets 196 have been moved apart a distance (W) to provide for the increased base dimension of the air bag. In the preferred embodiment the mounting brackets 196 are not spaced apart at a maximum separation (permitted by the flexible fabric of the air bag) but are spaced close enough to enable a small amount of slack to be formed in the top of the air bag 100 and yet be placed in tension after the air bag is inflated to provide for adequate stability. When the air bag 100 begins to inflate the top of the air bag (that part of the air bag generally between the brackets 196) pushes against the underside of the roof 14. The slack mentioned above permits the top of the air bag to fill the space between the mounting brackets and form a stable base as generally shown in FIG. 6. When the air bag 100 begins to inflate, the top portions of the panels 160 and 162 will also push against an adjacent respective panel 192. This action places the small panels 192 in tension and permits the air bag to react against the roof to provide increased stability.

An inspection of the various figures shows the air bag 100, when not inflated, is generally symmetrical about a central plane, that is, the right and left-hand sides of the air bag are formed by similar panels 160 and 162; each side of the air bag includes a corresponding panel or set of panels 192*a* and 192*a*, and each outer tether 200*a* and 200*b* includes generally identical halves placed on opposing sides of the air bag. As can be seen, when inflated the air bag is not perfectly symmetrical about the central plane due mainly to the opposing bulges and creases. To encourage the air bag 100 to deploy uniformly, straight down, the panels 160,162 which form opposing sides of each of the inflatable chambers, and the external tether halves 201*a* and 201*b* of each outer tether, and the triangular panels 192*a* and 192*b* are folded in respective, facing accordion fold patterns on both sides generally shown as numeral 220. The folded air bag may be held in place by a thin breakable fabric member (often made from fabric or like material) such as 222, which is easily torn upon inflation of the air bag.

A more rigid plastic cover or covering (deployment cover) generally shown as 224 is secured to the underside of the roof and protects the folded air bag. This cover 224 may include one or more separatable sections, which upon separation form hinged deployment doors, common to air bag covers. It should be appreciated the size of the air bag module 80 and its components shown in FIG. 5 are enlarged, relative to the roof and seats for the purpose of illustration. The cover sections are separated by a line or region that is of a thin-walled construction so as to form a tear seam, generally shown by numeral 226. In another embodiment the plastic cover is omitted and the folded air bag stowed behind a headliner, which includes an appropriate tear seam.

Upon activation of the inflator 130 (shown in FIG. 2), the air bag 100 breaks through the coverings 222 and 224 to achieve an inflated condition as illustrated in FIG. 6. Typically, the module 80 in FIG. 5 will be mounted along the centerline of the vehicle; the inflated air bag will generally be bisected by a vertical plane 227 through the vehicle centerline. Depending upon the geometry of the passenger compartment of the vehicle the module can be installed to one or the other side of the vertical-centerline plane 227. The air bag 100 when inflated is located between the opposing side-to-side seating positions such as vehicle seats 18*a* and 18*b*.

As mentioned above, when the air bag is inflated, the top portion of the air bag, generally identified by numeral 230 of FIG. 6, will inflate upwardly and push against the roof rail 14, and this inflated top portion 230 of the air bag will fill the space between the separated pair of mounting brackets 196. In this manner, the now-inflated top portion 230 of the air bag 100 provides for the relatively wide base from which the remainder of the air bag 100 expands downwardly. This pressurized base portion (the top of the air bag against the roof) facilitates the air bag in resisting any lateral (side-to-side) bending of the inflated air bag and lessens the tendency to move laterally.

Reference is again briefly made to FIG. 2*d*, which shows another air bag 100*a*, which includes a single inflatable chamber 110. This smaller bag can be considered as one-half of the bag 100. This air bag 100*a* includes the vertical stability enhancing features of the larger bag 100 such as the internal tether 140 and the external tethering arrangement of the panels 192 and 200. The mounting brackets 196 described above can be used with this embodiment; however, the brackets 196 have been replaced by pieces of fabric such as a woven length of seat belt webbing or other reinforced material 196*a*. Additionally in this embodiment the tabs at the top of each respective panel 192*a*, 192*b* and 200*a*, 200*b* are sewn (see seam 197) directly to the material 196*a*. This air bag can deploy from the roof 14 and is designed to be placed between occupants in an adjacent seating relationship. For the air bag 100*a*, the inlet 120 is located near one side of the air bag. An inflator 130 (diagrammatically shown by an arrow) is connected to this inlet 120.

Figure 8A:
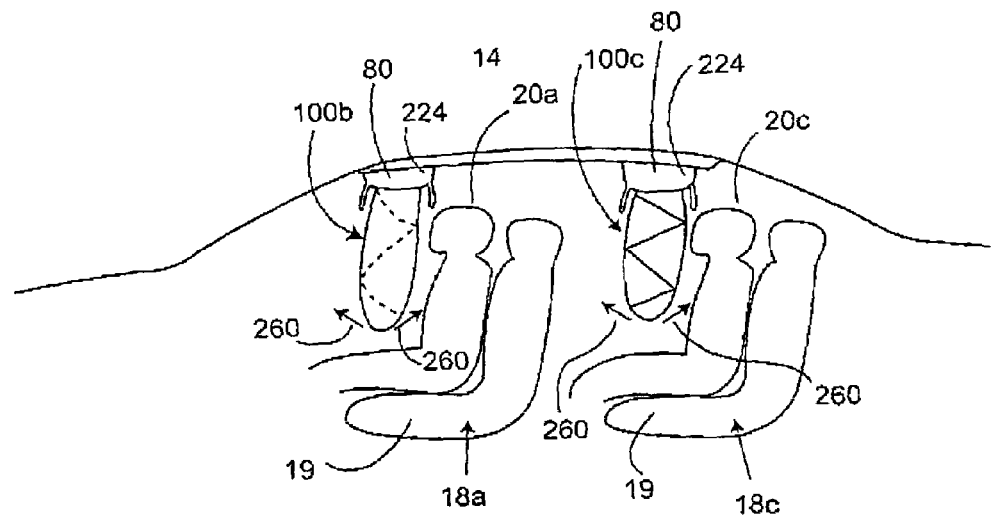
FIGS. 8a and 8b show another embodiment of the invention.

From the above it can be seen the air bags 100 and 100*a* can include one or more inflatable chambers 110 and 112 and may or may not include a central non-inflatable region 116, see FIG. 2. In FIGS. 1-7 the air bag was configured to be positioned, when deployed, between adjacent occupants of the vehicle in the same or in an adjacent seating position, that is, between the two adjacent occupants of the front seat (or seats in the case of bucket seats) or between occupants in the second, third, etc. rows of seats of the vehicle. The air bags 100 and 100*a* are equally suited to be configured to deploy in front of each occupant (or set of occupants) of the vehicle and as such will provide improved protection for these occupants. For example, FIG. 8*a* illustrates a front seat 18*a* and rear seat 18*c* occupied by respective occupants 20*a* and 20*c*. Secured to the roof 14 of the vehicle is a plurality of air bag modules 80, which respectively include air bags 100*b* and 100*c*, which are initially maintained within a respective breakable housing 224.

Figure 8B:
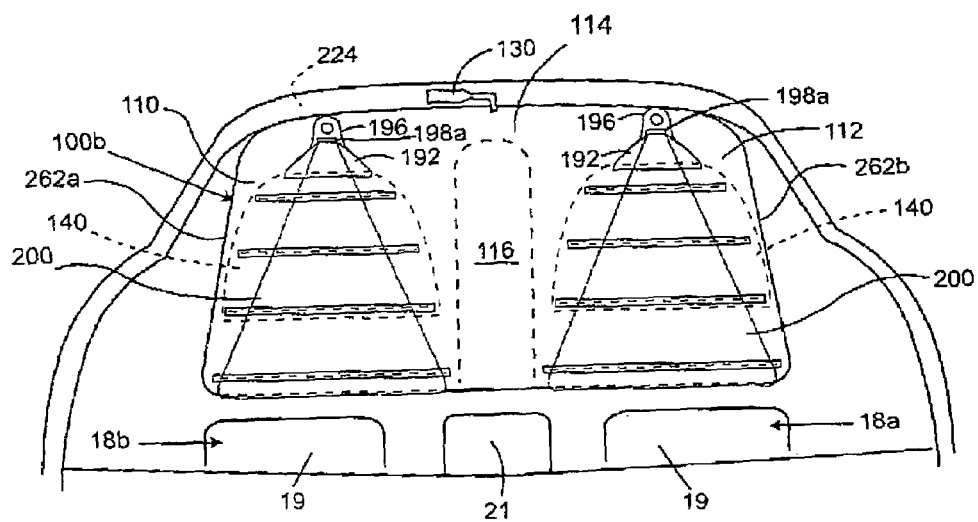

FIG. 8*b* diagrammatically illustrates air bag 100*b* in a deployed condition and is located in front of the occupant or occupants to be protected. This air bag can include one or more inflatable chambers (such as used in air bag 100). For the purpose of illustration, the bag 100*b* has been chosen to include many of the features of the occupant-to-occupant air bag 100. For example, air bag 100b includes two inflatable chambers 110 and 112 and an optional narrow non-inflatable region 116, which can be located in the center of the vehicle above the center console 21.

A narrow inflatable conduit or passage 114 (which can be integrally formed in the air bag) connects chambers 110 and 112. As can be appreciated the non-inflatable region 116 would not be used in a bench seat configuration so that a center-seated occupant would also be protected. For the purpose of illustration the seat cushions 19 associated with each of the adjacent seats 18a and 18b are illustrated below the inflatable air bag 100b, that is, below the respective inflatable chamber 110 and 112. (The occupant is not illustrated in FIG. 8b)

As will be recognized from the figures, the air bag 100b also includes an internal tether 140, one for each chamber 110 and 112, arranged in a zigzag configuration. The air bag further includes the external tethering means including a pair of oppositely positioned triangular panels 192 secured to a respective mounting bracket 196 (one such configuration for each inflatable chamber). The air bag 100b further includes external tethers 200 (one for each inflatable chamber 110 and 112). Depending upon the width of the air bag only one external tether can be used to cradle or envelop (the lower portions of) the air bag 100b.

In the context of air bag 100b, improved vertical stability of the air bag can be equated to the reduced tendency of the air bag to move in a fore and aft direction as shown by arrows 260 (see FIG. 8a).

Reference is again briefly made to FIG. 8b. As mentioned the deployed air bag 100b is spaced above the top of the seat cushion 19. This separation distance between the bottom of the air bag and the top of the seat cushion is chosen so the inflated air bag can gently pressurize the top of the occupant's upper leg. The downward force created by the air bag on the occupant, as well as the inflatable wall created by the inflated air bag, will hold the (front or rear) occupant in his or her respective seat and prevent what is known in the art as submarining (the tendency of the occupant to slip below the air bag).

As can be seen from FIGS. 8a, 8b, the inflated air bag provides a vertically deployed, inflatable wall. As a result, there is very little momentum of the inflating air bag directed toward the seated occupant (driver or passenger). The air bag dimensions mentioned are chosen to be sufficiently wide; the sides 262a and 262b of air bag 100b are chosen to be positioned close to or against the adjacent sides of the vehicle, which aids in keeping the occupant in a pre-crash seated configuration.

As can be appreciated, the two-chamber air bag 100b can be replaced by two single-chamber air bags 100a such as the air bag illustrated FIG. 2d.

Figure 9:
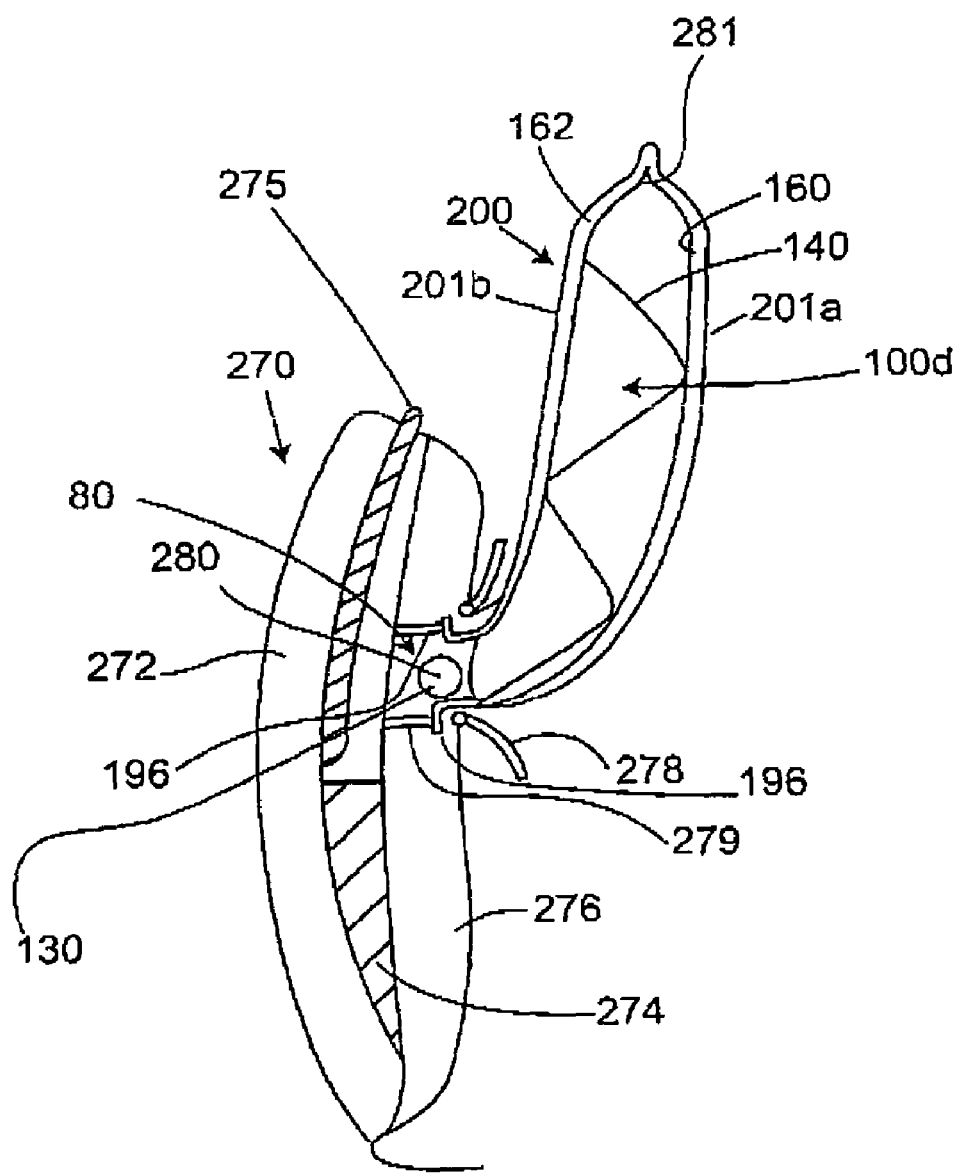
FIG. 9 shows a further embodiment of the invention.

Reference is briefly made to FIG. 9, which illustrates a cross-sectional view of a door 270 of a typical convertible vehicle and shows another side impact air bag 100d. The door in general includes an exterior side 272 and an internal support structure 274 such as a frame of known construction, which supports a window 275. The support structure 274 is covered by a plastic trim panel 276. In the present invention this trim panel 276 is configured to include an opening (cavity or void) to receive an air bag module 80 including an air bag 100d and housing 279 with deployment door(s) 278. The housing 279 can be located within the hollow opening, void or cavity 280 behind the trim (trim panel) 276.

The air bag module of FIG. 9 also includes an inflator 130 communicated to the air bag 100d. The air bag is of similar construction to the above-described air bags and includes panels 160 and 162 as well as an internal tether 140 arranged in a zigzag configuration. Extending from the center 281 of the air bag (which is now the top of the air bag in this inflated configuration) is the external panel 200 having panel halves 201a and 201b, each of which connects to an appropriate fastener such as the above-mentioned bracket of reinforced material 196. In the context of the convertible vehicle, the fasteners 196 are secured to an adjacent structural door member or other structural member located near the door 278 or housing 279. In this case, the external tether 201b can be made shorter than the tether 201a on the opposing side of the air bag to guide the air bag upwardly as it deploys from the vehicle door and to create geometric stability.

Figure 10B:
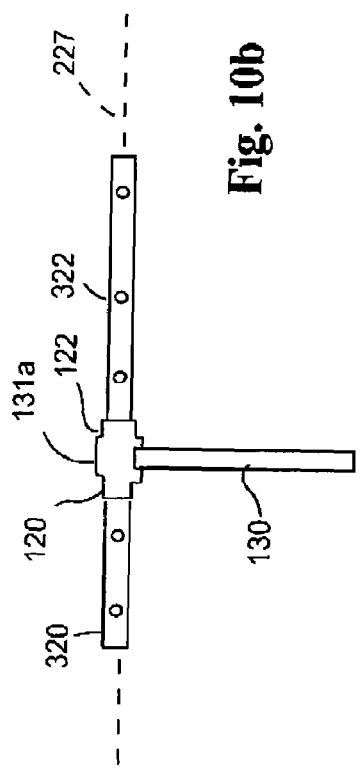
FIGS. 10a and 10b illustrate an alternate embodiment of the invention.
Figure 10A:
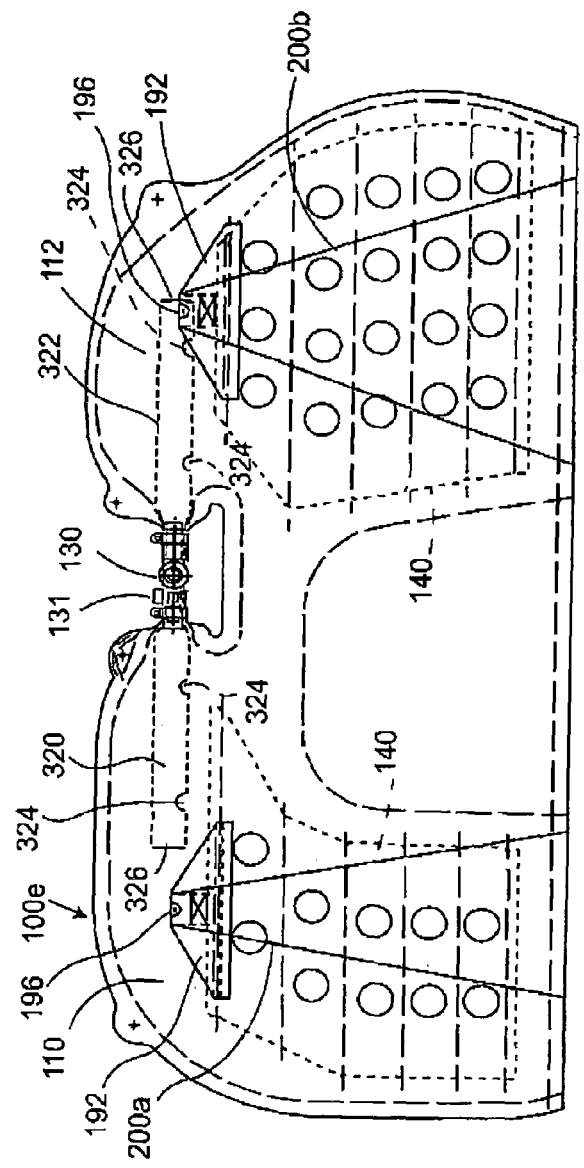

Reference is briefly made to FIGS. 10a and 10b, which show another embodiment of the present invention. The air bag 100e of FIG. 10a is substantially identical to air bag 100 of FIG. 2. For the purpose of illustration, the external tethers 200a and 200b of FIG. 10a are each shown dissimilar in size. The inflator 130 is used to inflate both of the inflatable chambers 110 and 112.

As can be seen in FIG. 10b a central axis of inflator 130 is arranged perpendicular to a vertical plane 227 (and is appropriately secured to the roof). The inflator 130 is received within a housing or connector 131a. In a broad sense the housing or connector 131a has a T-shape having a single input port connected to the inflator and two output ports or exits 120 and 122. Inflation gas can be supplied directly from the exit ports 120 and 122 to each of the inflatable chambers 110 and 112 (which was shown in the embodiment of the FIG. 2). However, in the illustrated embodiment each of the exit ports 120 and 122 is respectively connected to a hollow, flexible tube or passage (formed integrally with the air bag) or conduit 320 and 322. Each of the tubes includes one or more distribution holes or ports 324. The end 326 of each of the tubes can be closed or left open to further control the distribution of inflation gas to each of the inflatable chambers 110 and 112.

Many changes and modifications in the above-described embodiment of the invention can, of course, be carried out without departing from the scope thereof. Accordingly, that scope is intended to be limited only by the scope of the appended claims.

The invention claimed is:

1. An air bag (100) configured to deploy in a generally vertical direction, comprising:
  at least one inflatable chamber (110; 112) defined by a flexible cushion;
  first mounting means (180 and 196) for mounting the air bag to a mounting surface at a roof of a vehicle and for providing, proximate a fixed first end of the inflatable chamber, in cooperation with other portions of the air bag, a base at or near a roof of a vehicle, from which the air bag extends as the air bag inflates;
  directing means, operatively connected to the first mounting means and to a portion of the cushion remote from the first mounting means, for reducing a tendency of the air bag to move laterally during and after inflation;
  wherein the first mounting means includes:
    a first mounting panel of material of triangular shape secured to one side of the air bag and a second mounting panel of material of triangular shape secured to an opposite side of the air bag; and
    a mounting member located at an apex of each of the first and second mounting panels for mounting the first and second mounting panels to an adjacent portion of a vehicle.

2. The air bag as defined in claim 1 wherein the mounting member is adapted to mount to a roof portion of the vehicle.

3. An air bag assembly (80), comprising:
an air bag (100) configured to deploy in a generally vertical direction, the air bag having at least one inflatable chamber (110, 112) defined by a material so configured, the chamber including a first end and an opposite second end and a first side and an opposite second side;
first mounting means (180, 196) for mounting the air bag to a mounting surface at a roof of a vehicle and for providing, proximate the first end of the inflatable chamber, a base from which the air bag extends as the air bag inflates downwardly;
an external tether connected to the air bag proximate the second end of the chamber and including respective tether ends connected to the first mounting means; and
an internal tether (140) linking sides of the inflatable chamber in a zigzag configuration, configured so the width of the air bag generally decreases from the first end to the second end, for increasing side-to-side stability of the air bag.

4. The assembly as defined in claim 3 wherein the internal tether (140) creates in combination with the sides of the air bag a plurality of partially enclosed chambers vertically stacked one on another.

5. The assembly as defined in claim 4 wherein each chamber is open at its respective sides.

6. The assembly as defined in claim 4 wherein the size of each partially enclosed chamber decreases in a direction from the first end to the second end of the inflatable chamber.

7. The assembly as defined in claim 4 wherein the internal tether provides a common wall separating adjacent chambers.

8. An air bag assembly (80), comprising:
an air bag (100) configured to deploy in a generally vertical direction, the air bag having at least one inflatable chamber (110, 112) defined by a material so configured, the chamber including a first end and an opposite second end and a first side and an opposite second side;
first mounting means (180, 196) for mounting the air bag to a mounting surface at a roof of a vehicle and for providing, proximate the first end of the inflatable chamber, a base from which the air bag extends as the air bag inflates downwardly;
an external tether connected to the air bag proximate the second end of the chamber and including respective tether ends connected to the first mounting means;
wherein the first mounting means includes a first piece of material secured to a respective side of the material forming the inflatable chamber, the first piece of material being connected to one of a mounting bracket (196) and a piece of fabric, each of which is adapted to be connected to the mounting surface.

9. The assembly as defined in claim 8 wherein the first piece of material includes a triangularly shaped panel secured along one side thereof to a respective side of the inflatable cushion, the triangularly shaped panel having opposing ends.

10. The assembly as defined in claim 9 wherein each end of each triangularly shaped panel is connected to the first mounting means.

11. The assembly as defined in claim 8 wherein the first mounting means and the external tether are configured such that when the inflatable chamber is inflating the external tether is placed in tension.

12. The assembly as defined in claim 8 wherein the inflatable chamber is arranged so that when inflated the inflatable chamber is in a plane that is also co-linear with a centerline of the vehicle and positioned between adjacent occupant seating positions.

13. The assembly as defined in claim 8 wherein the inflatable chamber is arranged so that when inflated the inflatable chamber is in a plane that is perpendicular to a centerline of the vehicle and located in front of one or more seating positions.

14. The assembly as defined in claim 8 wherein each side of the air bag is folded into a respective accordion fold.

15. The assembly as defined in claim 8 wherein the first mounting means comprises two spaced members wherein the spacing therebetween is in the range of 10 to 20 cm and wherein when the air bag is inflated the top of the air bag presses against an inner surface of the roof, between the two spaced members.

16. The assembly as defined in claim 8 wherein the air bag is configured to inflate generally along the centerline of the vehicle.

17. The assembly as defined in claim 8 wherein the air bag is configured to inflate generally perpendicular to the centerline of the vehicle.

18. An air bag assembly (80), comprising:
an air bag (100) configured to deploy in a generally vertical direction from a door or side panel of a convertible motor vehicle, the air bag having at least one inflatable chamber (110, 112) defined by a material so configured, the chamber including a first end and an opposite second end and a first side and an opposite second side; the air bag including an internal tether (140), linking sides of the inflatable chamber;
the air bag configured to be mounted to the door or side panel proximate the first end of the inflatable chamber, the air bag also including an external tether connected to the air bag proximate the second end of the chamber and including respective tether ends connected to the door or side panel providing a base from which the air bag extends as the air bag inflates,
wherein the air bag is configured to inflate from the door of a convertible vehicle.

19. An air bag assembly comprising:
an air bag configured to deploy upwardly from a side door or panel of the motor vehicle, the air bag having at least one inflatable chamber, the chamber including an inlet end and a remote end and a first or outer side and an opposite second or inner side; the air bag also including an external tether, the external tether secured to the remote end and having a first tether portion configured to overlay at least a portion of the outer side and a second tether portion to overlay at least a portion of the inner side, each of the first tether portion and the second tether portion having a respective end adapted to be connected to the motor vehicle at the side door or panel, wherein a length of the first tether portion from its attachment to the vehicle to its connection with the remote end is shorter than a corresponding length of the second tether portion to encourage the upward deployment of the air bag.

20. The air bag assembly of claim 19 including a zigzag internal tether alternating connected to the first and second sides of the inflatable chamber.

21. An air bag assembly (80), comprising:
an air bag (100) configured to deploy in a generally vertical direction, the air bag having at least one inflatable chamber (110, 112) defined by a material so configured, the chamber including a first end and an opposite second end and a first side and an opposite second side, the air bag configured to be mounted to a roof of a vehicle, the air bag proximate the first end of the inflatable chamber providing a base from which the air bag extends as the air bag inflates downwardly;

an external tether connected to the air bag proximate the second end of the chamber and including respective tether ends configured to be connected to the roof; and an internal tether (140) linking sides of the inflatable chamber in a zigzag configuration.

22. The air bag assembly of claim 21 wherein sections of the internal tether restrict the width of the air bag to generally decrease from the first end to the second end, for increasing side-to-side stability of the air bag.

* * * * *